United States Patent [19]

Schmalstieg et al.

[11] Patent Number: 5,061,775

[45] Date of Patent: Oct. 29, 1991

[54] HEAT CURABLE MIXTURES AND THEIR USE FOR THE FORMATION OF COATINGS ON HEAT RESISTANT SUBSTRATES

[75] Inventors: Lutz Schmalstieg, Cologne; Klaus Nachtkamp, Dusseldorf, both of Fed. Rep. of Germany; Karl-Ludwig Noble, Pittsburgh, Pa.

[73] Assignee: Bayer Aktiengesellschaft, Leverkusen, Fed. Rep. of Germany

[21] Appl. No.: 549,508

[22] Filed: Jul. 6, 1990

[30] Foreign Application Priority Data

Jul. 11, 1989 [DE] Fed. Rep. of Germany ....... 3922767

[51] Int. Cl.$^5$ .............................................. C08G 18/80
[52] U.S. Cl. ...................................................... 528/45
[58] Field of Search ............................................ 528/45

[56] References Cited

U.S. PATENT DOCUMENTS

| | | | |
|---|---|---|---|
| 3,770,703 | 11/1973 | Gruber et al. | 260/77.5 |
| 4,495,229 | 1/1985 | Wolf et al. | 427/388 |
| 4,576,979 | 3/1986 | Schupp et al. | 523/404 |

FOREIGN PATENT DOCUMENTS 1644813  1/1971  Fed. Rep. of Germany .

*Primary Examiner*—Maurice J. Welsh
*Attorney, Agent, or Firm*—Joseph C. Gil; Thomas W. Roy

[57] ABSTRACT

The present invention relates to a coating composition which may be cured at elevated temperature and is based on A) a polyisocyanate component containing at least one organic polyisocyanate having reversibly blocked isocyanate groups and a molecular weight of 398 to 25,000, excluding the weight of the blocking agent, the isocyanate groups being reversibly blocked with a secondary monoamine and B) an isocyanate reactive component containing at least one organic polyamine having a molecular weight of 60 to 499 and at least two primary amino groups.

The present invention also relates to the use of these coating compositions for the formation of coatings on heat resistant substrates.

17 Claims, No Drawings

HEAT CURABLE MIXTURES AND THEIR USE FOR THE FORMATION OF COATINGS ON HEAT RESISTANT SUBSTRATES

BACKGROUND OF THE INVENTION

1. Field of the Invention

This invention relates to new heat curable mixtures, based on a polyisocyanate component containing blocked isocyanate groups and a reactive component containing primary amino groups, and to the use of the mixtures for the formation of coatings on heat resistant substrates.

2. Description of the Prior Art

The preparation of coating compositions based on ketoxime-blocked polyisocyanates and organic polyamines is described in DE-OS 1,544,813. These systems harden at temperatures above about 120° C. but have the disadvantage of insufficient storage stability, especially in the absence of solvents. They also have the disadvantage that they can only be applied in comparatively thin layers.

DE-AS 2,131,299 describes a heat curable mixture of a polyisocyanate component containing isocyanate groups blocked with ε-caprolactam and cycloaliphatic polyamines. The systems described in the said prior publication have good storage stability and are suitable for the formation of thick coatings with superior mechanical properties. The disadvantage of these systems, however, is the comparatively high reaction temperatures of about 160° C. required for curing.

It is an object of the present invention to provide new heat curable systems which result in coatings of superior quality even when applied in thick layers. It is an additional object of the present invention to provide heat curable systems which possess both good storage stability at room temperature and low stoving temperatures.

These objects may be achieved with the heat curable systems of the present invention as described hereinafter.

SUMMARY OF THE INVENTION

The present invention relates to a coating composition which may be cured at elevated temperature and is based on A) a polyisocyanate component containing at least one organic polyisocyanate having reversibly blocked isocyanate groups and a molecular weight of 398 to 25,000, excluding the weight of the blocking agent, the isocyanate groups being reversibly blocked with a secondary monoamine and B) an isocyanate reactive component containing at least one organic polyamine having a molecular weight of 60 to 499 and at least two primary amino groups.

The present invention also relates to the use of these coating compositions for the formation of coatings on heat resistant substrates.

DETAILED DESCRIPTION OF THE INVENTION

The use of organic polyisocyanates blocked with secondary monoamines in combination with isocyanate reactive compounds has been disclosed in DE-OS 3,221,558; however, this prior publication is primarily directed to monoamine-blocked low molecular weight polyisocyanates in combination with relatively high molecular weight organic polyhydroxyl compounds.

DE-OS 3,311,516 relates to compositions based on polyisocyanates blocked with secondary monoamines and relatively high molecular weight polyaddition, polycondensation or polymerization products containing at least two OH and/or NH groups. The reactants specifically described for the blocked isocyanates, however, are not low molecular weight organic polyamines of the type used as component B) according to the present invention, but rather relatively high molecular weight polyhydroxyl compounds of the type known from polyurethane chemistry or relatively high molecular weight hydroxyl group-containing and amino group-containing reaction products of low molecular weight diamines and epoxide resins. In the examples this reference, stoving temperatures of from 140° to 180° C. are disclosed which is an indication that the previously mentioned object of employing low stoving temperatures in accordance with the present invention was not recognized or achieved with the systems disclosed in the prior publication.

In view of the fact that mixtures of isocyanates blocked with secondary monoamines and polyalcohols can be cured at comparatively low temperatures, it must regarded as distinctly surprising that mixtures of isocyanates blocked with secondary monoamines and polyamines, which are much more reactive with blocked isocyanates, have sufficient storage stability.

The preparation of polyisocyanates containing isocyanate groups blocked with secondary monoamines, which are suitable for use as component A) according to the invention, is carried out by reacting the organic polyisocyanates described below with the secondary monoamines described below at temperatures of 0° to 100° C., preferably 20° to 50° C. The quantity of secondary monoamine used for the blocking reaction should be at least equivalent to the quantity of isocyanate groups to be blocked. A slight excess of secondary monoamines is in many cases advantageous to ensure that all of the isocyanate groups will be blocked. The amount of excess secondary monoamine is generally not more than 20 mole %, preferably not more than 10 mole %, based on the isocyanate groups which are to be blocked. The blocking reaction may be carried out in the presence of inert solvents such as lacquer solvents of the type described below.

The starting polyisocyanates used for the preparation of the blocked polyisocyanates A) include organic polyisocyanates or polyisocyanate mixtures having an (average) weight average molecular weight ($M_w$) of 398 to about 25,000, preferably about 1000 to 8000. These polyisocyanates include known derivatives of monomeric organic polyisocyanates, in particular derivatives containing biuret, isocyanurate and/or urethane groups. The derivatives are preferably known isocyanate group-containing prepolymers which may be obtained, for example, by the reaction of relatively high molecular weight polyhydroxyl compounds with di- or polyisocyanates at an NCO/OH equivalent ratio of 1.5 to 2.5, or by the reaction of relatively high molecular weight polyhydroxyl compounds with a large excess of di- or polyisocyanates followed by removal of the excess polyisocyanate, e.g., by thin layer distillation. The reaction is generally carried out at 40° to 140° C., optionally in the presence of about 0.001 to 2% by weight, based on the weight of the starting components, of suitable catalysts such as triethylene diamine, dibutyl tin dilaurate or tin-II octoate.

Suitable starting compounds for the preparation of such prepolymers include low molecular weight polyhydroxyl compounds having a molecular weight of 62 to 299 such as ethylene glycol, propylene glycol, trimethylol propane or 1,6-dihydroxyhexane; low molecular weight hydroxyl group-containing esters of such polyols with dicarboxylic acids of the type described below; low molecular weight ethoxylation and/or propoxylation products of such monomeric polyols; and any mixtures of such modified or unmodified alcohols.

The prepolymers are, however, preferably prepared from the known relatively high molecular weight polyhydroxyl compounds having a molecular weight ($M_n$, which may be determined from the functionality and the hydroxyl group content) of 300 to 20,000, preferably 1000 to 5000. These polyhydroxyl compounds have at least two hydroxyl groups per molecule and a hydroxyl group content of 0.17 to 17% by weight, preferably 0.68 to 5.1% by weight.

Examples of relatively high molecular weight polyhydroxyl compounds used for the preparation of the prepolymers include the polyester polyols prepared by reacting the low molecular weight, monomeric alcohols previously described with polybasic carboxylic acids such as adipic acid, sebacic acid, phthalic acid, isophthalic acid, tetrahydrophthalic acid, hexahydrophthalic acid, maleic acid, the anhydrides of such acids and mixtures of such acids and acid anhydrides. Polylactones containing hydroxyl groups are also suitable for the preparation of the prepolymers or semiprepolymers, in particular poly-ε-caprolactones.

Polyether polyols which may be used for the preparation of the prepolymers may be obtained in known manner by the alkoxylation of suitable starter molecules include the monomeric polyols previously described, water, organic polyamines containing at least two NH bonds and mixtures of such starter molecules. Particularly suitable alkylene oxides for the alkoxylation reaction are ethylene oxide and/or propylene oxide, which may be introduced into the alkoxylation reaction in admixture or sequentially.

Hydroxyl group-containing polycarbonates which may be used for the preparation of the prepolymers may be obtained by the reaction of the monomeric diols previously described with phosgene or diaryl carbonates such as diphenyl carbonate.

Polythioether polyols which may be used for the preparation of the prepolymers may be obtained by the polycondensation of thiodiglycol with itself or with the diols and/or polyols previously described.

Polyacetals which may be used for the preparation of the prepolymers may be obtained by the polycondensation products of formaldehyde and the previously described diols or polyols in the presence of acid catalysts such as phosphoric acid or p-toluene sulphonic acid.

Mixtures of the polyhydroxyl compounds described above may also be used.

Examples of suitable di- or polyisocyanates for the preparation of the isocyanate group-containing prepolymers include hexamethylene diisocyanate, 1,3- and/or 1,4-diiso-cyanatocyclohexane, 1-isocyanato-3,3,5-trimethyl-5-isocyanatomethyl-cyclohexane (isophorone diisocyanate) and 4,4'-diisocyanatodicyclohexylmethane.

Aromatic polyisocyanates are, however, preferred due to the exceptionally low stoving temperatures obtained when using these compounds. Examples of aromatic polyisocyanates include 2,4-diisocyanatotoluene and mixtures thereof preferably containing up to 35% by weight, based on the total mixture, with 2,6-diisocyanatotoluene; 4,4'-diisocyanatodiphenylmethane and mixtures thereof with 2,4'- and optionally 2,2'-diisocyanatodiphenylmethane and/or with higher functional products of the diphenylmethane series.

Known derivatives of the previously described diisocyanates containing biuret or isocyanurate groups are also suitable, in particular derivatives of hexamethylene diisocyanate. So-called mixed derivatives are also suitable, e.g., derivatives containing urethane groups and either biuret or isocyanurate groups. Derivatives of this type may be obtained, for example, by modifying a polyisocyanate containing biuret or isocyanurate groups, for example, a polyisocyanate prepared from hexamethylene diisocyanate, with a subequivalent quantity of a polyhydroxyl compound of the type exemplified above.

Secondary monoamines used for preparing the blocked polyisocyanates used according to the invention as component A) include any organic compounds containing a secondary amino group and preferably are otherwise inert towards isocyanate groups. Suitable compounds include those corresponding to the formula

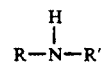

wherein R and R' may be identical or different and represent aliphatic hydrocarbon groups having 1 to 18, preferably 1 to 6 carbon atoms or cycloaliphatic hydrocarbon groups having 6 to 13, preferably 6 to 9 carbon atoms, or R and R' together with the nitrogen atom may form a heterocyclic ring having 5 or 6 ring members such ring may also contain additional hetero atoms, e.g., nitrogen or oxygen.

Examples of suitable secondary monoamines include dimethylamine, diethylamine, diisopropylamine, di-n-butylamine, diisobutylamine, N-methyl-n-hexylamine, N-methyl-stearylamine, N-ethylcyclohexylamine, dicyclohexylamine, piperidine, hexahydroazepine, pyrrolidine and morpholine. Secondary amines containing other isocyanate reactive groups in addition to the secondary amino group, such as hydroxyl groups, which are less reactive with the isocyanate groups than secondary amino groups, may also be used but are less preferred. Examples of these compounds include aminoalcohols such as diethanolamine or diisopropanolamine.

The molecular weight of the blocked polyisocyanates may be determined from the stoichiometry of the starting materials used for their preparation in the same way as the molecular weight of the unblocked polyisocyanate. For molecular weights above 1000, the method of gel permeation chromatography may be employed using polystyrene as the calibrating substance.

For the preparation of the mixtures according to the invention, the blocked polyisocyanates A) may if necessary be used in known paint solvents such as ethyl acetate, butyl acetate, methyl ethyl ketone, methyl isobutyl ketone, propylene glycol monomethylether acetate, toluene, xylene or mixtures of such solvents.

Component B) of the mixtures according to the invention are polyamines having a molecular weight of 60 to 499, preferably 60 to 300, and containing at least two, preferably two, primary amino groups per molecule. Examples include ethylene diamine, 1,2-diaminopropane, 1,3-diaminopropane, 1,4-diaminobutane, 1,6-diaminohexane, 2,2,4- and/or 2,4,4-trimethylhexamethylenediamine and polyamines which contain secondary amino groups in addition to at least two primary amino groups such as diethylene triamine or triethylene tetramine.

Polyamines, especially diamines, which have one or more cycloaliphatic rings are preferred. Examples of these preferred diamines include 1,4-diaminocyclohexane, 4,4'-diaminodicyclohexylmethane, 1,3-diaminocyclopentane, 4,4'-diaminodicyclohexylsulphone, 4,4'-diaminodicyclohexyl-propane-(1,3), 4,4'-diaminodicyclohexylpropane-(2,2), 4-isopropyl-1,2-diaminocyclohexane, 3,3'-dimethyl-4,4'-diaminodicyclohexylmethane, 3-aminomethyl-3,3,5-trimethylcyclohexylamine (isophorone diamine) and bis-aminomethyl-tricyclodecane available as "TCD-Diamine" from Hoechst AG. 3,3'-Dimethyl-4,4'diaminodicyclohexylmethane is particularly preferred.

The mixtures according to the invention generally contain components A) and B) in quantities corresponding to an equivalent ratio of blocked isocyanate groups of component A) to primary and optionally secondary amino groups of component B) of 0.8:1 to 1.2:1, preferably 0.9:1 to 1.1:1 and more preferably 0.95:1 to 1.05:1.

Coating compositions containing the mixtures according to the invention as binders may also contain known auxiliary agents and additives used in coatings technology such as solvents, fillers, levelling agents and pigments.

The compositions according to the invention have a more advantageous ratio of storage stability to stoving temperature than known compositions. This ratio may be varied by the monoamine used as blocking agent and the polyisocyanate used such that it is possible to prepare mixtures which are stable in storage at room temperature and can be cured at temperatures of about 130° C. It is also possible to prepare mixtures which can be cured at temperatures of about 80° C., but these are stable for only a few days at room temperature. The ratio of storage stability to stoving temperature can thus be adjusted as required in each individual case by suitable choice of the secondary monoamine and the polyisocyanate.

It is both surprising and advantageous that the mixtures according to the invention can easily be applied in thick layers. Thus, for example, coatings with dry layer thicknesses of 500 μm can be obtained which are free from blisters.

According to one particularly preferred embodiment, the compositions according to the invention are used for the formation of coatings which protect against stone chipping on motor vehicles. The coating compositions used for this purpose contain the usual fillers, pigments and additional additives used for such protective layers. Since coatings protecting against stone chipping are generally applied in relatively thick layers, it is in many cases necessary to add thickeners and substances which render the layers thixotropic in order to prevent the layers dripping or running down vertical surfaces.

The parts and percentages given in the following examples are based on weight unless otherwise indicated.

EXAMPLE 1

3000 g of a polyether polyol having an OH number of 48 and prepared by the propoxylation of trimethylolpropane and 1400 g of 2,4-diisocyanatotoluene were heated to 70° C. for 5 hours with stirring. The excess diisocyanate was then removed by thin layer distillation under vacuum. A prepolymer containing isocyanate end groups and having an isocyanate content of 3.2% was obtained. 103 g of di-n-butylamine were rapidly added dropwise to 1000 g of this prepolymer at room temperature. The temperature of the mixture rose to about 40° C. Stirring of the mixture was continued without heating until the product was to from isocyanate.

1000 g of the product thus prepared were mixed with 82 g of 3,3'-dimethyl-4,4'-diaminodicyclohexylmethane (equivalent ratio of blocked isocyanate groups to amino groups=1:1). The viscosity of the mixture was 40,000 mPa.s/22° C. After 7 days storage at room temperature, the viscosity was 58,000 mPa.s/22° C. A sample was applied to a steel plate which had been coated with an electrodeposition lacquer. Heat treatment at 130° C. for 30 minutes resulted in a highly elastic film which had excellent bond strength and was free from blisters up to a dry layer thickness of 450 μm.

EXAMPLE 2

86 g of N-methyl-cyclohexylamine were added dropwise to 1000 g of the prepolymer from Example 1 at room temperature. The mixture was heated without stirring until no free isocyanate groups could be detected.

1000 g of the product thus prepared were mixed with 83.5 g of 3,3'-dimethyl-4,4'-diaminodicyclohexylmethane (equivalent ratio of blocked isocyanate groups to amino groups=1:1). The viscosity of the mixture was 95,000 mPa.s/22° C. After 4 days storage at room temperature, the viscosity was 110,000 mPa.s/22° C.

When this substance was applied to a steel plate coated with an electrodeposition lacquer, it was cured by heat treatment at 130° C. for 30 minutes to form a film which was free from blisters up to a dry layer thickness of 500 μm. The resulting film was highly elastic with excellent bond strength.

EXAMPLE 3

68 g of piperidine were added dropwise at room temperature to 1000 g of the prepolymer from Example 1. The mixture was stirred until no free isocyanate groups could be detected.

1000 g of the resulting blocked prepolymer were mixed with 85 g of 3,3'-dimethyl-4,4'-diaminoodicyclohexyl-methane (equivalent ratio of blocked isocyanate groups to amino groups=1:1). The mixture had an initial viscosity of 100,000 mPa.s/22° C. After 7 days storage at room temperature, the viscosity was 115,000 mPa.s. A film applied to a glass plate was cured by heat treatment at 130° C. for 30 minutes. An elastic film was obtained which was similar in its properties to the films of Examples 1 and 2.

EXAMPLE 4

81 g of diisopropylamine were added dropwise at room temperature to 1000 g of the prepolymer from Example 1. The mixture was stirred until no free isocyanate groups could be detected. 1000 g of the blocked polyisocyanate were mixed with 84 g of 3,3'-dimethyl-4,4'-diamino-dicyclohexylmethane (equivalent ratio of blocked isocyanate groups to amino groups=1:1). The mixture had an initial viscosity of 64,000 mPa.s/22° C. After 3 days storage at room temperature, the viscosity was 160,000 mPa.s/22° C. This mixture was stoved at an exceptionally low temperature. A lacquer film applied to a glass base was cross-linked by heat treatment at 80° C. for 30 minutes. The film was free from blisters up to a layer thickness of 500 μm. The properties of the film were similar to the films of Examples 1 to 3.

EXAMPLE 5

A 60% solution of a prepolymer was obtained from 8 moles of 2,4-diisocyanatotoluene, 2 moles of trimethylolpropane, 1 mole of diethylene glycol and 1 mole of a polypropylene glycol having a molecular weight of 1000 in a solvent mixture of equal parts xylene and methoxypropyl acetate. 1000 g of the prepolymer solution were stirred together with 174 g of dibutylamine at room temperature until no free isocyanate groups could be detected. 1000 g of the product were mixed with 130 g of 3,3'-dimethyl-4,4'-diaminodicyclohexyl-methane (equivalent ratio of blocked isocyanate groups to amino groups=1:1). The initial viscosity of the mixture was 30,000 mPa.s/22° C. The viscosity was 41,000 mPa.s/22° C. after storage for 7 days at room temperature. A lacquer film was applied to a steel plate coated with an electrodeposition and cross-linked by heat treatment at 130° C. for 30 minutes. Glossy films with excellent solvent resistance were obtained. The films were distinguished by their high elasticity combined with great hardness.

EXAMPLE 6

An isocyanate prepolymer was obtained from 31 parts by weight of diisocyanatodiphenylmethane (a mixture of equal parts of 2,4'- and 4,4'-diisocyanatodiphenylmethane) and 69 parts by weight of a polyetherdiol having a molecular weight of 4000 and prepared by the propoxylation of propylene glycol followed by ethoxylation of the propoxylation product (PO:EO ratio by weight=86:14). The prepolymer was dissolved to form a 65% solution in a mixture of equal parts methoxypropyl acetate and xylene. The isocyanate content of the solution was 8.6%.

277 g of di-n-butylamine were rapidly added dropwise at room temperature to 1000 g of this solution. When no free isocyanate groups could be detected, 191 g of 3,3'-dimethyl-4,4'-diamino-dicyclohexylmethane (equivalent ratio of blocked isocyanate groups to amino groups=1:1) were added with stirring.

A mixture having a viscosity of 800 mPa.s/22° C. was obtained. No rise in viscosity was observed after 14 days storage at room temperature. A lacquer film applied to a glass plate was cross-linked by heat treatment at 130° C. for 30 minutes. A glossy lacquer film with good solvent resistance was obtained.

EXAMPLE 7

80 parts by weight of a polyether polyol having a molecular weight of 2000 and prepared by the propoxylation of propylene glycol and 20 parts by weight of isophorone diisocyanate were reacted together at 100° C. in the presence of 0.2 parts by weight of dibutyl tin dilaurate to form an isocyanate prepolymer having an isocyanate content of 4%. 1000 g of this prepolymer were reacted with 101 g of diisopropylamine at room temperature. After termination of the blocking reaction, 85 g of bis-aminomethyl tricyclodecane (TCD-Diamine available from Hoechst AG) were added with stirring (equivalent ratio of blocked isocyanate groups to amino groups=1:1).

A mixture having a viscosity of 85,000 mPa.s/22° C. was obtained. No rise in viscosity was observed after 7 days storage at room temperature. A lacquer film applied to a glass plate was cross-linked by heat treatment at 140° C. for 30 minutes. Highly elastic films with excellent mechanical properties were obtained.

EXAMPLE 8

1000 g of the blocked prepolymer from Example 7 were mixed with 77 g of isophorone diamine (equivalent ratio of blocked isocyanate groups to amino groups=1:1.05). The initial viscosity of the mixture was 80,000 mPa.s/22° C. No rise in viscosity was observed after 7 days storage at room temperature. A lacquer film applied to a glass plate was cured by heat treatment at 140° C. for 30 minutes. A glossy, highly elastic film was obtained.

EXAMPLE 9

A mixture of 15 parts by weight of a polyester polyol obtained from 9.9 moles of phthalic acid anhydride, 0.13 moles of maleic acid anhydride, 4.8 moles of hexanediol-(1,6), 4.4 moles of perhydro bisphenol-A and 2 moles of trimethylolpropane, 50 parts by weight of a biuret polyisocyanate based on 1,6-diiscyanatohexane and having an isocyanate content of 22%, 15 parts by weight of xylene and 25 parts by weight of methoxypropyl acetate was heated to 100° C. until the 65% solution had a constant isocyanate content of 9.8%.

1000 g of the prepolymer solution were reacted with 425 g of dicyclohexylamine at room temperature (equivalent ratio of blocked isocyanate groups to amino groups=1:1). After no free isocyanate groups could be detected, 50 g of ethylene diamine were added. A highly viscous, storage stable mixture was obtained.

A lacquer film applied to a glass plate was cross-linked by heat treatment at 140° C. for 30 minutes. The clear lacquer film obtained had excellent solvent resistance.

EXAMPLE 10

1000 g of the blocked prepolymer from Example 9 were mixed with 127 g of an isomeric mixture of 2,2,4- and 2,4,4-trimethylhexamethylene diamine (equivalent ratio of blocked isocyanate groups to amino groups=1:0.98). A storage stable, highly viscous mixture was obtained which was cured by heat treatment at 140° C. for 30 minutes.

EXAMPLE 11

1000 g of the blocked prepolymer from Example 9 were mixed with 155 g of the diamine from Example 7 (equivalent ratio of blocked isocyanate groups to amino groups=1:0.98). A highly viscous, storage stable mixture was obtained. A film applied to a glass plate was cured by heat treatment at 140° C. for 30 minutes. A lacquer film having great hardness and excellent solvent resistance was obtained.

EXAMPLE 12

Preparation of a protective coating against stone chipping:

100 Parts by weight of the blocked prepolymer from Example 1, 46.2 parts by weight of the blocked prepolymer from Example 5, 13 parts by weight of 3,3'-dimethyl-4,4'-diaminodicyclohexylmethane, 14.3 parts by weight of titanium dioxide (Bayertitan R-UB-2), 1.4 parts by weight of iron-II-III-oxide (Bayferrox 303 T), 114.4 parts by weight of barium sulphate, 4.3 parts by weight of pyrogenic silica and 76.3 parts by weight of a 10:40:50 mixture of butyl acetate, methoxy butyl acetate and pine oil were mixed together. The initial viscosity of the primer was 1450 mPa.s/22° C. After 3 days' storage, the viscosity is 1800 mPa.s/22° C. The protective primer against stone chipping was applied to a steel plate coated with an electrodeposition lacquer (air spraying at 30° C.) and stoved at 130° C. for 30 minutes. The coating was free from blisters up to a layer thickness of 400 μm.

To test for resistance to stone chipping, the plate was continuously bombarded with fine grit until the substrate was exposed (Daimler-Benz Test).
Air pressure: 0.6 bar
Layer thickness: 176 μm
Bombardment time: 5 min, 35 sec

EXAMPLE 13

(Comparison Example of DE-AS 2,131,299)

100 g of ε-caprolactam were added with stirring at 40° C. to 1000 g of the prepolymer from Example 1. The reaction mixture was heated to 90° C. and stirred at this temperature until no free isocyanate groups could be detected. 1000 g of the blocked prepolymer were mixed with 82.5 g of 3,3'-dimethyl-4,4'-diamino-dicyclohexylmethane. The viscosity of the mixture was 30,000 mPa.s/22° C. No increase in viscosity was observed after 7 days storage at room temperature. A heat treatment at 160° C. for 30 minutes was required to cure the coating. If the heat treatment was carried out at 140° C. for 30 minutes, the coatings obtained were tacky.

EXAMPLE 14

(Comparison Example of DE-OS 1,644,813)

a) 70 g of methyl ethyl ketoxime were added dropwise over a period of 3 hours at 50° C. to 1000 g of the prepolymer from Example 1. The mixture was stirred at 50° C. until no free isocyanate groups could be detected.

b) 117 g of methyl ethyl ketoxime were added dropwise within 3 hours at 50° C. to 1000 g of the prepolymer from Example 5. The mixture was stirred at 50° C. until no free isocyanate groups could be detected.

Preparation of a Protective Coating Against Stone Chipping

100 Parts by weight of the blocked prepolymer from a), 46.5 parts by weight of the blocked prepolymer from b), 13 parts by weight of 3,3'-dimethyl-4,4'-diamino-dicyclohexyl-methane, 14.3 parts by weight of titanium dioxide (Bayertitan R-UB-20), 1.4 parts by weight of iron-II-III-oxide (Bayferrox 303 T), 114.4 parts by weight of barium sulphate, 4.3 parts by weight of pyrogenic silica and 76.3 parts by weight of a 10:40:50 mixture of butyl acetate, methoxy butyl acetate and pine oil were mixed together. The initial viscosity of the primer was 850 mPa.s/22° C. The viscosity was 1070 mPa.s/22° C. after 3 days storage at room temperature and 1540 mPa.s/22° C. after 7 days storage at room temperature.

The protective coating against stone chipping was applied to a steel plate (air spraying at 30° C.) which had been coated with electrodeposition lacquer and the protective coating was then stoved at 140° C. for 30 minutes. Freedom from blisters was only possible up to a layer thickness of 150 μm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which may be cured at elevated temperature and comprises
   A) a polyisocyanate component comprising at least one organic polyisocyanate having reversibly blocked isocyanate groups and a molecular weight of 398 to 25,000, excluding the weight of the blocking agent, said isocyanate groups being reversibly blocked with a secondary monoamine and
   B) an isocyanate reactive component comprising at least one organic polyamine having a molecular weight of 60 to 499 and containing at least two primary amino groups.

2. The coating composition of claim 1 wherein said organic polyisocyanate comprises a prepolymer containing isocyanate groups reversibly blocked with a secondary monoamine, said prepolymer being based on the reaction product of (i) an aromatic polyisocyanate having a molecular weight of 174 to 300 and (ii) an organic polyhydroxyl compound having a molecular weight of 1000 to 5000 and containing ether and/or ester groups.

3. The coating composition of claim 1 wherein said organic polyamine comprises a diamine containing at least one cycloaliphatic ring.

4. The coating composition of claim 2 wherein said organic polyamine comprises a diamine containing at least one cycloaliphatic ring.

5. The coating composition of claim 1 wherein said organic polyamine comprises 3,3'-dimethyl-4,4'-diaminodicyclohexylmethane.

6. The coating composition of claim 2 wherein said organic polyamine comprises 3,3'-dimethyl-4,4'-diaminodicyclohexylmethane.

7. A coated substrate which is prepared by coating a heat resistant substrate with a coating composition which comprises
   A) a polyisocyanate component comprising at least one organic polyisocyanate having reversibly blocked isocyanate groups and a molecular weight of 398 to 25,000, excluding the weight of the blocking agent, said isocyanate groups being reversibly blocked with a secondary monoamine and
   B) an isocyanate reactive component comprising at least one organic polyamine having a molecular weight of 60 to 499 and containing at least two primary amino groups,
and curing the coating at elevated temperature.

8. The coated substrate of claim 7 wherein said organic polyisocyanate comprises a prepolymer containing isocyanate groups reversibly blocked with a secondary monoamine, said prepolymer being based on the reaction product of (i) an aromatic polyisocyanate having a molecular weight of 174 to 300 and (ii) an organic polyhydroxyl compound having a molecular weight of 1000 to 5000 and containing ether and/or ester groups.

9. The coated substrate of claim 7 wherein said organic polyamine comprises a diamine containing at least one cycloaliphatic ring.

10. The coated substrate of claim 8 wherein said organic polyamine comprises a diamine containing at least one cycloaliphatic ring.

11. The coated substrate of claim 7 wherein said organic polyamine comprises 3,3'-dimethyl-4,4'-diaminodicyclohexylmethane.

12. The coated substrate of claim 8 wherein said organic polyamine comprises 3,3'-dimethyl-4,4'-diaminodicyclohexylmethane.

13. The coated substrate of claim 7 wherein said coated substrate is a motor vehicle part.

14. The coating composition of claim 1 wherein said organic polyamine has a molecular weight of 60 to 300.

15. The coating composition of claim 2 wherein said organic polyamine has a molecular weight of 60 to 300.

16. The coated substrate of claim 7 wherein said organic polyamine has a molecular weight of 60 to 300.

17. The coated substrate of claim 8 wherein said organic polyamine has a molecular weight of 60 to 300.

* * * * *